United States Patent
Kumar et al.

(10) Patent No.: US 12,367,175 B2
(45) Date of Patent: Jul. 22, 2025

(54) ASSESSING THE EFFECTIVENESS OF AN ARCHIVAL JOB

(71) Applicant: Dell Products L.P., Hopkinton, MA (US)

(72) Inventors: Shiv Kumar, Pune (IN); Kaushik Gupta, Pune (IN)

(73) Assignee: Dell Products L.P., Hopkinton, MA (US)

( * ) Notice: Subject to any disclaimer, the term of this patent is extended or adjusted under 35 U.S.C. 154(b) by 133 days.

(21) Appl. No.: 17/951,241

(22) Filed: Sep. 23, 2022

(65) Prior Publication Data

US 2024/0104050 A1    Mar. 28, 2024

(51) Int. Cl.
*G06F 16/11* (2019.01)
*G06F 11/34* (2006.01)

(52) U.S. Cl.
CPC ........ *G06F 16/113* (2019.01); *G06F 11/3409* (2013.01); *G06F 16/125* (2019.01)

(58) Field of Classification Search
CPC .... G06F 16/113; G06F 16/125; G06F 16/185; G06F 11/3409
See application file for complete search history.

(56) References Cited

U.S. PATENT DOCUMENTS

| | | | |
|---|---|---|---|
| 7,107,298 B2 * | 9/2006 | Prahlad | H04L 61/4523 707/673 |
| 9,613,064 B1 * | 4/2017 | Chou | G06F 16/182 |
| 10,049,116 B1 * | 8/2018 | Bajpai | G06F 11/1453 |
| 10,742,735 B2 * | 8/2020 | Kumar | H04L 67/1097 |
| 11,561,714 B1 * | 1/2023 | Mertes | G06F 3/0604 |
| 2010/0333116 A1 * | 12/2010 | Prahlad | G06F 3/0649 713/153 |
| 2012/0084523 A1 * | 4/2012 | Littlefield | G06F 3/065 711/E12.103 |
| 2013/0275394 A1 * | 10/2013 | Watanabe | G06F 16/1752 707/692 |
| 2013/0339407 A1 * | 12/2013 | Sharpe | G06F 16/137 707/827 |
| 2016/0036677 A1 * | 2/2016 | McNutt | H04L 43/16 709/224 |
| 2019/0065508 A1 * | 2/2019 | Guturi | G06F 16/2246 |
| 2019/0213123 A1 * | 7/2019 | Agarwal | G06F 3/0608 |
| 2023/0029616 A1 * | 2/2023 | Pandit | G06F 3/067 |
| 2023/0161672 A1 * | 5/2023 | Raspudic | G06F 11/3452 711/162 |

* cited by examiner

*Primary Examiner* — Vaishali Shah

(74) *Attorney, Agent, or Firm* — Anderson Gorecki LLP

(57) ABSTRACT

An archival job is assessed to calculate loss of data reduction efficiency due to block-level data deduplication. Archivable data, or individual storage objects or data structures therein, are moved to archival storage contingent upon satisfaction of a predetermined condition related to data reduction efficiency. Archivable data, or individual storage objects or data structures therein, that fail to satisfy the predetermined condition are maintained in primary storage. The loss of data reduction efficiency and the predetermined condition may be expressed as a percentage of maximum possible data reduction that would result in the absence of data deduplication.

20 Claims, 7 Drawing Sheets

ASSESSING THE EFFECTIVENESS OF AN ARCHIVAL JOB

TECHNICAL FIELD

The subject matter of this disclosure is generally related to archival copies of data.

BACKGROUND

Data storage systems such as storage area networks (SANs), network-attached storage (NAS), and software-defined and disaggregated variants thereof can maintain storage objects for use by instances of host applications running on clusters of host servers. Such data storage systems include arrays of individual disk drives such as solid-state drives (SSDs) based on electrically erasable programmable read-only memory (EEPROM) technology such as NAND and NOR flash memory. Data reduction techniques such as deduplication may be implemented to reduce storage requirements. Data replication techniques such as generation of snapshots may be implemented to help avoid data loss and enable storage objects to be restored to state at specific points in time. Data archive techniques such as migrating old, infrequently accessed data to cloud storage may be implemented to reduce storage requirements.

SUMMARY

Some aspects of the presently disclosed invention are predicated on recognition that data deduplication and maintenance of local snapshots can reduce efficiency of data reduction achieved by archiving data. Deduplication algorithms and local snapshots often use metadata such as pointers to associate multiple storage objects or data structures with a single copy of a block of data. For example, multiple files may be associated with a single copy of a duplicated block or multiple snapshots may be associated with a single copy of a duplicated block. In such scenarios, moving one of the files or snapshots to a remote archive does not free primary storage space equivalent to the size of the file or snapshot because each duplicated block must be maintained locally because of associations with other files or snapshots. Depending on the magnitude of the loss of data reduction efficiency, the amount of storage space freed may be insufficient to justify use of the resources required to archive data, such as network bandwidth and storage space in the data archive.

All examples, aspects, and features mentioned in this document can be combined in any technically possible way.

In accordance with some implementations, a method comprises: calculating potential data reduction that would result from moving archivable data from primary storage to archival storage, where at least some data on the primary storage is deduplicated; comparing the calculated potential data reduction with a predetermined condition; and halting movement of at least some of the archivable data from primary storage to archival storage in response to determining that the calculated potential data reduction fails to satisfy the predetermined condition.

In accordance with some implementations, an apparatus comprises: primary storage comprising non-volatile media; a compute node configured to manage access to data stored on the primary storage; and an archival data assessor configured to: calculate potential data reduction that would result from movement of archivable data from primary storage to archival storage, where at least some data on the primary storage is deduplicated; compare the calculated potential data reduction with a predetermined condition; and halt movement of at least some of the archivable data from primary storage to archival storage in response to a determination that the calculated potential data reduction fails to satisfy the predetermined condition.

In accordance with some implementations, a non-transitory computer-readable storage medium stores instructions that when executed by a computer cause the computer to perform a method comprising: calculating potential data reduction that would result from moving archivable data from primary storage to archival storage, where at least some data on the primary storage is deduplicated; comparing the calculated potential data reduction with a predetermined condition; and halting movement of at least some of the archivable data from primary storage to archival storage in response to determining that the calculated potential data reduction fails to satisfy the predetermined condition.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features. For example, multiple virtual computing devices could operate simultaneously on one physical computing device. The term "logic"

is used to refer to special purpose physical circuit elements and software instructions that are stored on a non-transitory computer-readable medium and implemented by multi-purpose tangible processors. The terms "disk" and "drive" are used interchangeably and are not intended to be limited to a particular type of non-volatile data storage media.

Figure 1:
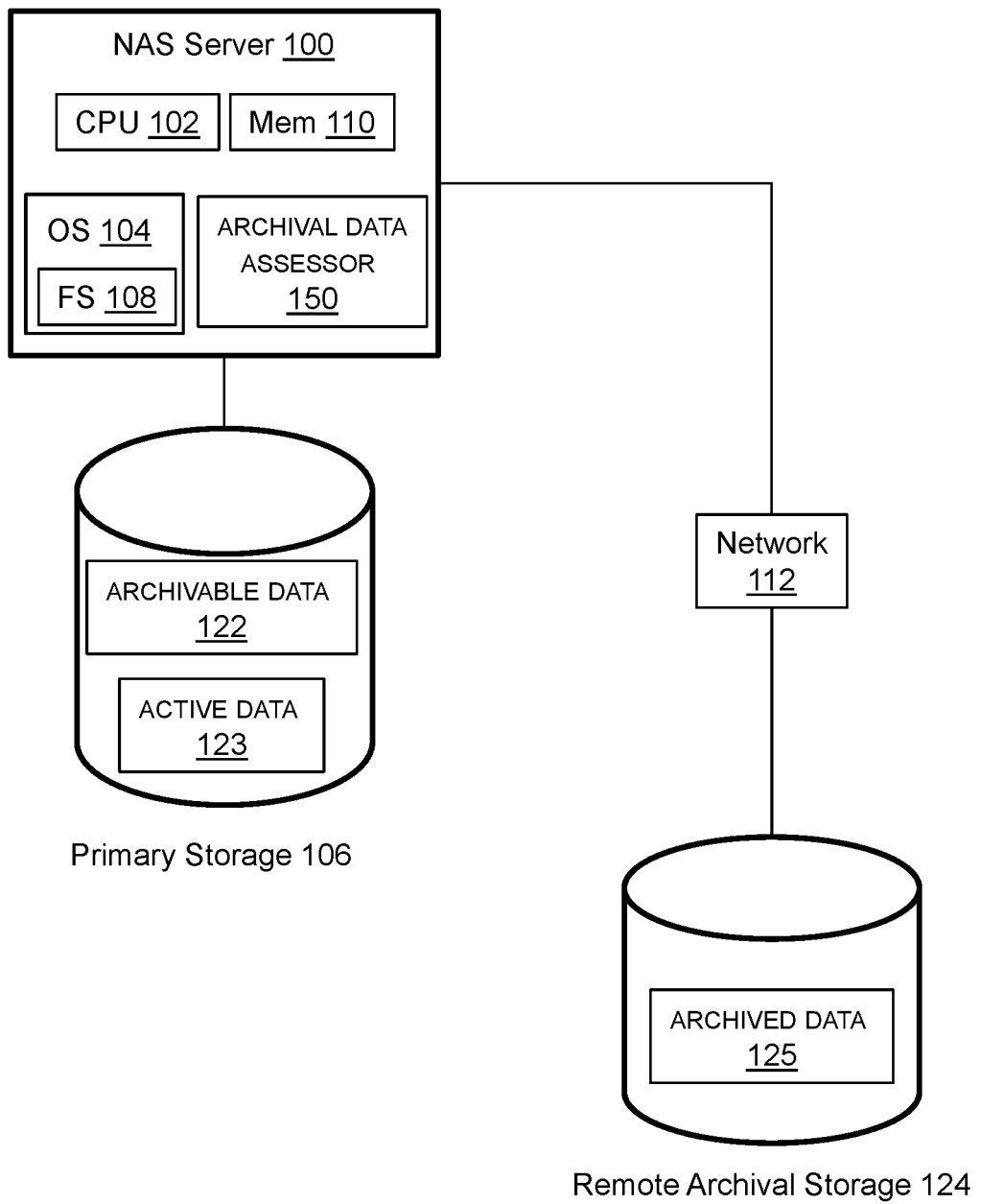
FIG. 1 illustrates a storage system with an archival data assessor that calculates the effects of block-level data deduplication on data reduction for data archive jobs.

FIG. 1 illustrates a storage system with an archival data assessor 150 that calculates the efficiency of data archive jobs, including loss of efficiency due to block-level data deduplication. The data storage system includes a NAS server 100 with a multi-core CPU 102, memory bank 110, and operating system (OS) 104 with an embedded filesystem 108. The NAS server 100 manages access to active data 123 stored on local, non-volatile, primary storage 106 such as an array of SSDs. Data on the primary storage 106 that is no longer actively in use becomes archivable data 122. Archivable data can potentially be moved to remote, non-volatile, archival storage 124 such as a cloud storage provider, which is reachable via network 112. Archivable data becomes archived data 125 after being moved to archival storage. The NAS server implements block-level data deduplication, snapshots, or both on the active data and archivable data stored on primary storage. Before moving the archivable data 122 to remote archival storage 124, the archival data assessor 150 evaluates the archivable data to determine how much data reduction efficiency is lost due to deduplication of blocks in the archivable data. Further, the archival data assessor may automatically halt movement of some or all of the archivable data 122 to archival storage based on whether data reduction efficiency satisfies predetermined criteria. In one example, the archivable data is only moved to archival storage 124 if the utilized capacity of primary storage will be reduced by at least X % of the size of the archivable data, where X is a predetermined value. In another example, only those data structures and/or storage objects in the archivable data that will free at least X % of their currently utilized primary storage space as a result of being moved to archival storage are moved to the archival storage 124. In other words, the archivable data 122 may be assessed as a single unit or the data structures and storage objects within the archivable data may be assessed separately.

Figure 2A:
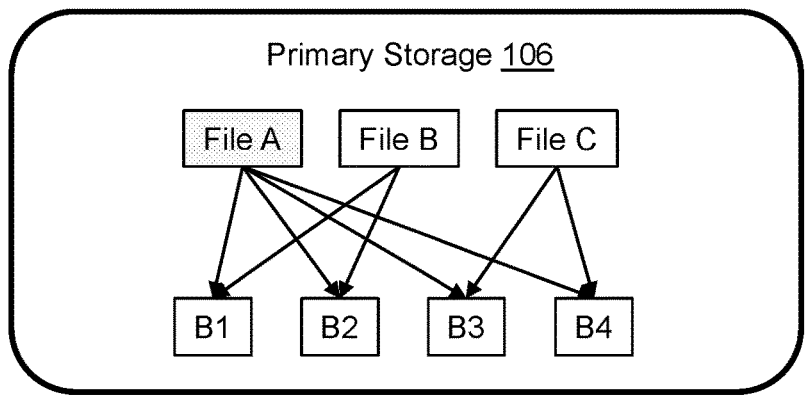
FIGS. 2A and 2B illustrate an archive job that would not yield any data reduction.
Figure 2B:
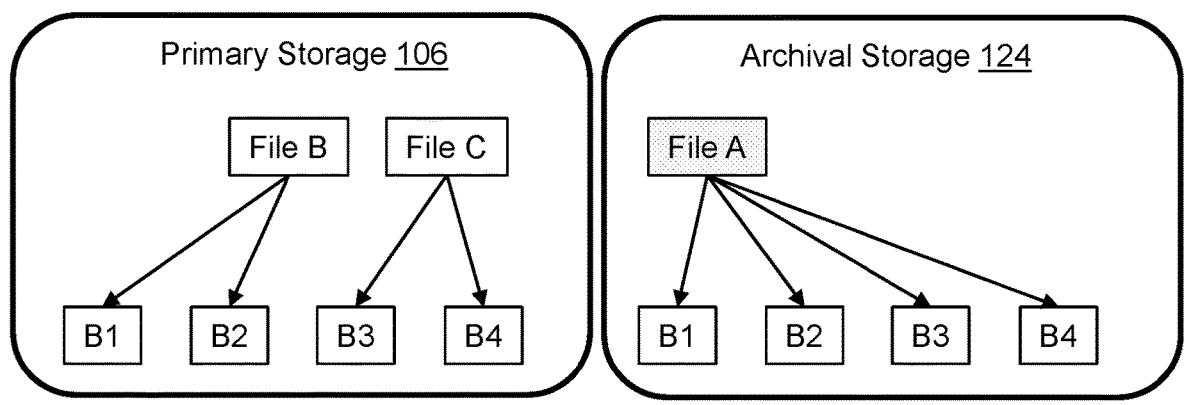

FIGS. 2A and 2B illustrate an archive job that would not yield any data reduction due to total loss of data reduction efficiency. FIG. 2A illustrates state prior to archive and FIG. 2B illustrates assessed post-archive state. File A is archivable. File B and File C are active data. As specifically shown in FIG. 2A, file A includes blocks B1, B2, B3, and B4. File B includes blocks B1 and B2. File C includes blocks B3 and B4. Because of deduplication, only one copy of each block is stored in primary storage 106. Pointers associate the files with the single copies of the blocks. As specifically shown in FIG. 2B, moving file A to archival storage 124 requires that blocks B1, B2, B3, and B4 are transmitted to, and stored on, the archival storage. However, copies of blocks B1, B2, B3, and B4 must remain on primary storage 106 because those blocks are also included in file B and file C. Specifically, file B includes blocks B1 and B2, while file C includes blocks B3 and B4. Consequently, no storage space would be freed on primary storage 106 as a result of moving file A to archival storage. Such a total loss in data reduction efficiency is calculated by the archival data assessor prior to performance of the archival job. Furthermore, the archival data assessor may automatically halt the archival job based on the calculated loss in data reduction efficiency.

Figure 3A:
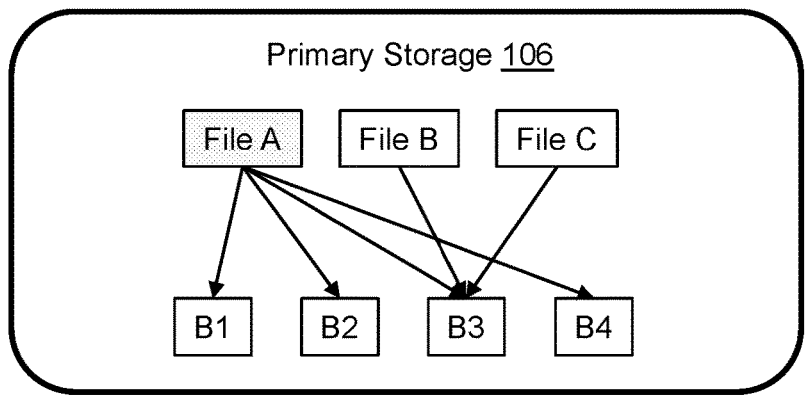
FIGS. 3A and 3B illustrate an archive job that would yield partial data reduction relative to the size of the file being archived.
Figure 3B:
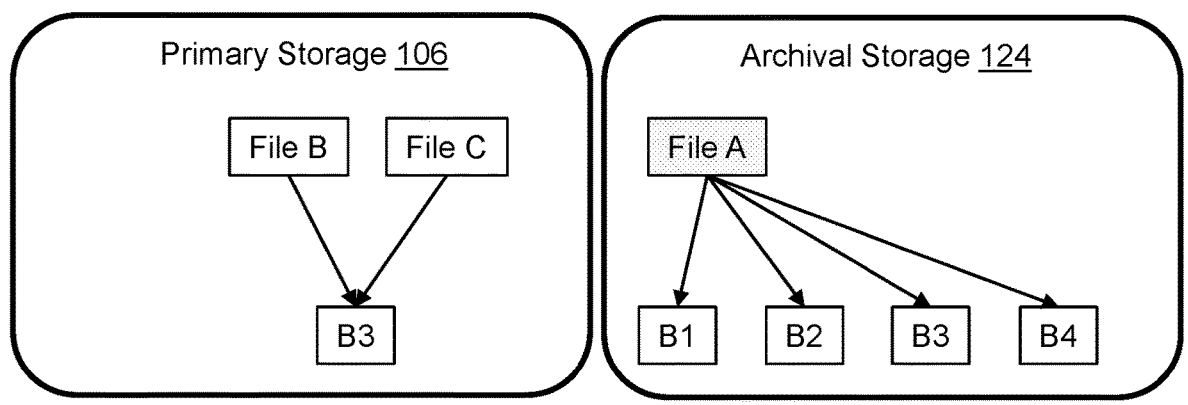

FIGS. 3A and 3B illustrate an archive job that would yield partial data reduction relative to the size of the file being archived. FIG. 3A illustrates state prior to archive and FIG. 3B illustrates assessed post-archive state. File A is archivable. File B and File C are active data. As specifically shown in FIG. 3A, file A includes blocks B1, B2, B3, and B4. File B includes block B3, and file C includes block B3. Because of deduplication, only one copy of each block is stored in primary storage 106. Pointers associate the files with the single copies of blocks. As specifically shown in FIG. 3B, moving file A to archival storage 124 requires that blocks B1, B2, B3, and B4 are transmitted to, and stored on, the archival storage. However, a copy of block B3 must remain on primary storage 106 because that block is also included in file B and file C. Consequently, there is some storage space freed on primary storage 106 as a result of moving file A to archival storage, but less than the size of file A. Specifically, three of four potentially archivable blocks are freed, which corresponds to a 25% loss of data reduction efficiency. Such a loss in data reduction efficiency is calculated by the archival data assessor prior to performance of the archival job. The archival data assessor may allow or automatically halt the archival job based on the calculated loss in data reduction efficiency as compared with predetermined criteria.

Figure 4A:
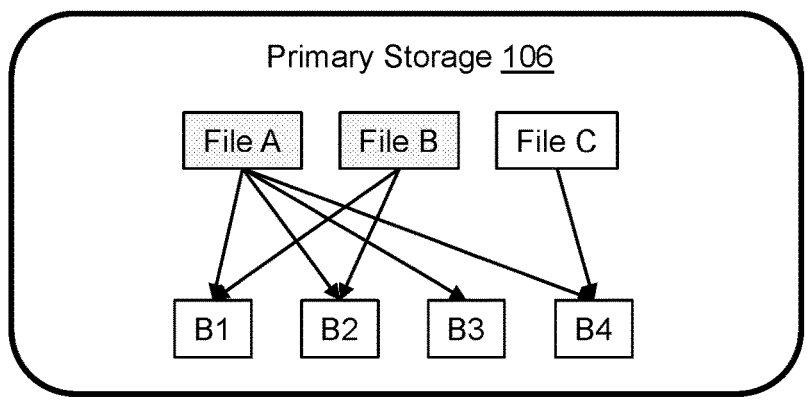
FIGS. 4A and 4B illustrate an archive job that only yields data reduction when two data structures are archived contemporaneously.
Figure 4B:
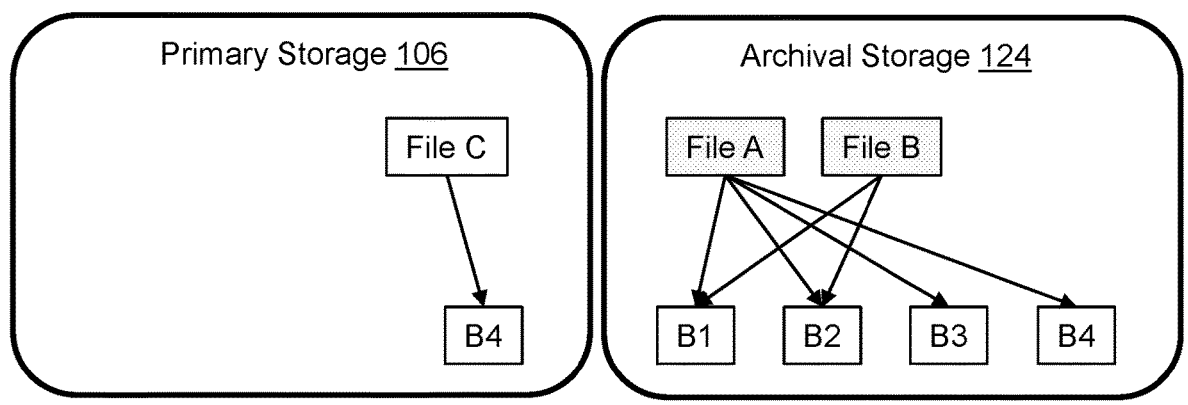

FIGS. 4A and 4B illustrate an archive job that only yields data reduction when two data structures are archived contemporaneously. FIG. 4A illustrates state prior to archive and FIG. 4B illustrates assessed post-archive state. File A and File B are archivable. File C is active data. As specifically shown in FIG. 4A, file A includes blocks B1, B2, B3, B4, while file B includes blocks B1, B2. File C includes block B4. Because of deduplication, only one copy of each block is stored in primary storage 106. Pointers associate the files with the single copies of blocks. As specifically shown in FIG. 4B, moving file A and file B to archival storage 124 requires that blocks B1, B2, B3, and B4 are transmitted to, and stored on, the archival storage. However, a copy of block B4 must remain on primary storage 106 because that block is included in file C. Consequently, there is some storage space freed on primary storage 106 as a result of moving file A and file B to archival storage, but less than the size of file A and file B. Such a loss in data reduction efficiency is calculated by the archival data assessor prior to performance of the archival job. The archival data assessor may allow or automatically halt the archival job based on the calculated loss in data reduction efficiency as compared with predetermined criteria. Assessing archive of file A or file B independently would yield different indications of data reduction efficiency so it is potentially advantageous to assess archive of the files together.

Figure 5:
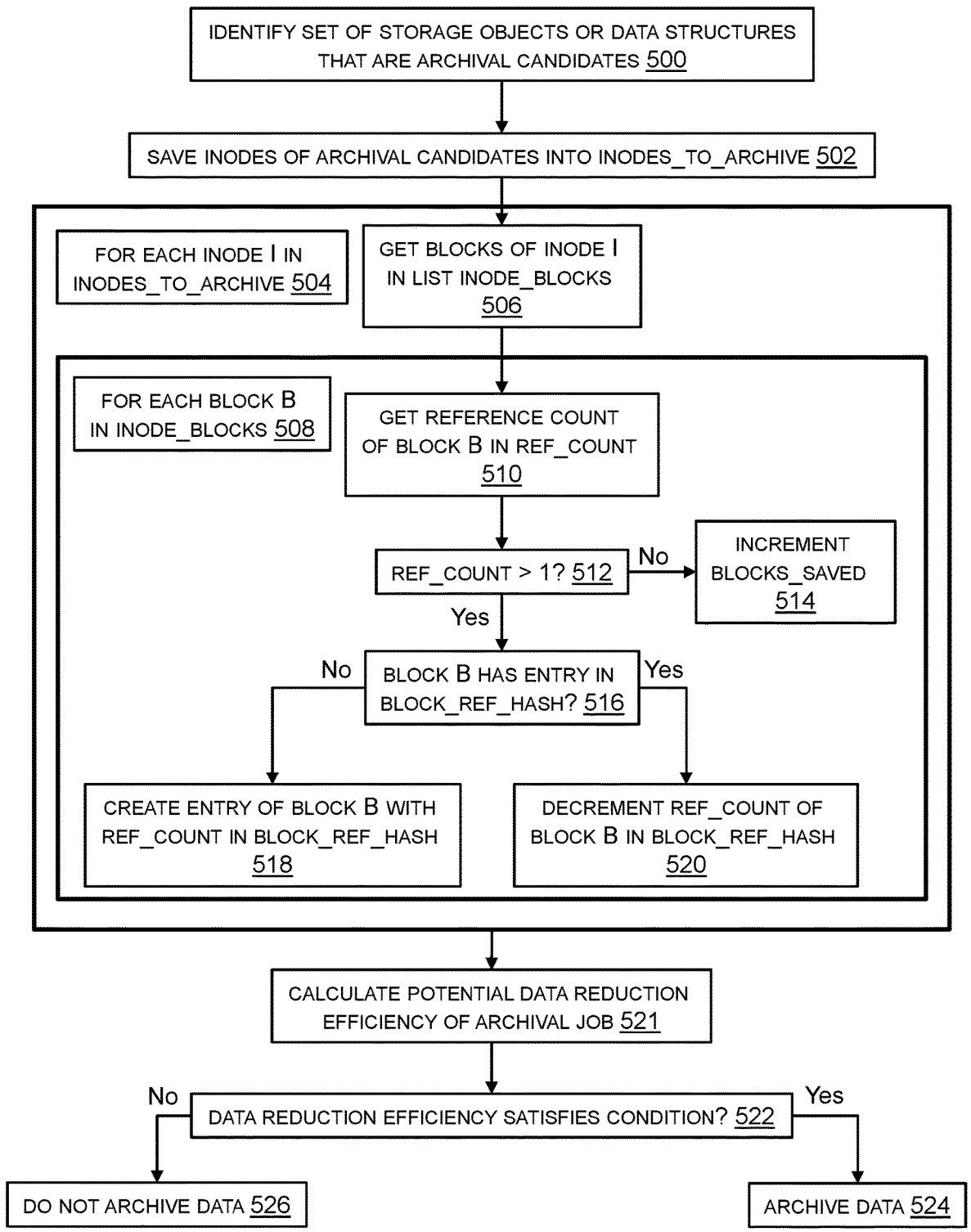
FIG. 5 illustrates a process for archiving data contingent on loss of data reduction efficiency due to data duplication.

FIG. 5 illustrates a process for assessing archive jobs and archiving data contingent on loss of data reduction efficiency due to data duplication satisfying predetermined conditions. Step 500 is identifying the set of storage objects or data structures that are archival candidates. The characteristics of an archival candidate may be defined in a wide variety of ways, but for context may be summarized as data that has reached a predetermined age and become inactive in the sense that it has not been recently accessed or is unlikely to be accessed in the future. Storage objects may include logical volumes of storage. Data structures are not necessarily files. Other types of data structures, such as databases, are known in the art. Step 502 is saving the inodes of the archival candidates into an inodes_to_archive list. The inodes are metadata structures that include reference pointers that associate blocks of data with storage objects and data structures. The inodes may also include a count of reference pointers. Step 506 is getting the blocks of inode I in a list inode_blocks. Step 510 is getting the reference count of block B in a variable ref_count. The reference count of block B is the number of pointers to block B from data structures and storage objects as indicated in the inode. If ref_count is not greater than 1, as determined in step 512, then step 514 is incrementing a blocks_saved variable that was initialized to zero. A reference count of 1 indicates that the block can be recycled on the primary storage after the archival job, thus freeing storage space. If ref_count is greater than 1, as determined in step 512, then step 516 is determining whether there is an entry for block B in a block_ref_hash. A reference count greater than 1 indicates that the block might not be recyclable on the primary storage after the archive job due to the existence of other pointers. However, the block might be recyclable on the primary storage after the archive job if the other data structures and storage objects that point to the block are also archivable. If there is an entry for block B in a block_ref_hash as determined in step 516, then step 520 is decrementing the ref_count of block B in block_ref_hash. This is an indication that other data structures and storage objects that point to the block are also archivable. If there is no entry for block B in a block_ref_hash as determined in step 516, then step 518 is creating an entry of block B with a ref_count in the block_ref_hash. The flow defined by steps 510, 512, 514, 516, 518, and 520 is performed for each block B in inode_blocks as indicated at loop step 508. The flow defined by step 506 and loop step 508 is performed for each inode I in inodes_to_archive as indicated in loop step 504. The value of blocks_saved indicates how many blocks can be freed on primary storage by the archival job.

The results of the archival job assessment are used to calculate potential data reduction efficiency of the archival job as indicated in step 512. The potential efficiency may be expressed in terms of storage capacity, blocks, percentages, or any of a wide variety of units. Step 522 is determining whether the potential data reduction efficiency of the archival job satisfies a predetermined condition. In one example the predetermined condition is that the utilized capacity of primary storage would be reduced by at least X % of the size of the archivable data, where X is a predetermined value. In another example the predetermined condition is that data structures and/or storage objects in the archivable data will free at least X % of their currently utilized primary storage space as a result of being moved to archival storage, where the data structures and storage objects are tested independently from each other. If the predetermined condition is satisfied as determined in step 522, then the data is archived as indicated in step 524. If the predetermined condition is not satisfied as determined in step 522, then the data is not archived as indicated in step 526.

Figure 6:
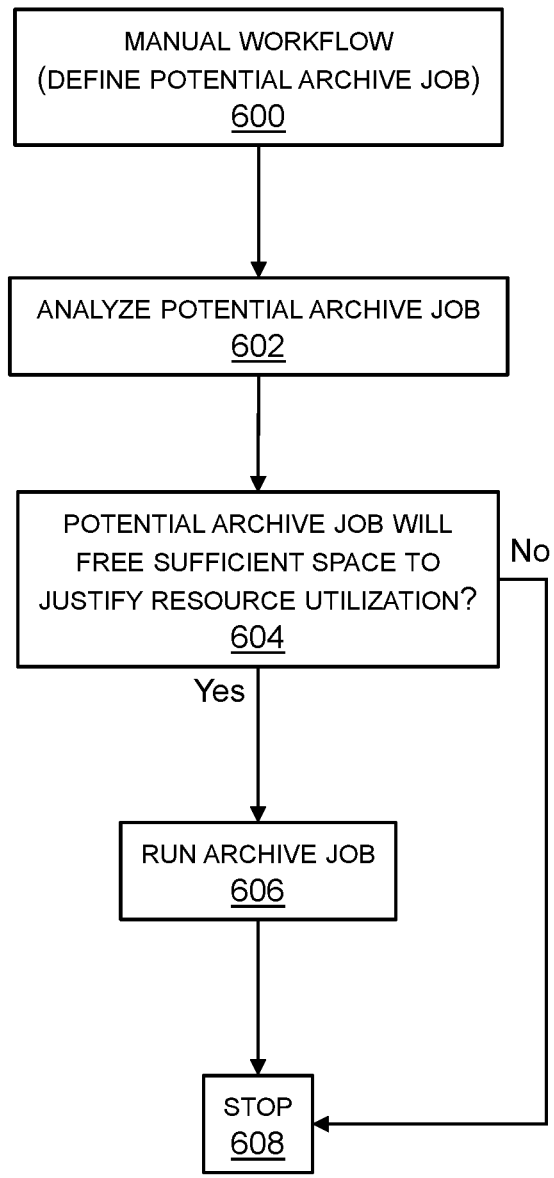
FIG. 6 illustrates a manual workflow based on the process of FIG. 5.

FIG. 6 illustrates a manual workflow based on the process of FIG. 5. Step 600 is defining a potential archive job. A user such as a storage administrator may do this via a dashboard/UI. The potential archive job is analyzed in step 602. Step 604 is determining whether the potential archive job will free sufficient space to justify utilization of the resources required to run the archive job. If the determination is no, then flow stops at step 608. If the determination is yes, then step 606 is the user running the archive job. In other words, steps 602 and 604 are performed by the archival data assessor and the other steps are performed in accordance with existing workflow.

Figure 7:
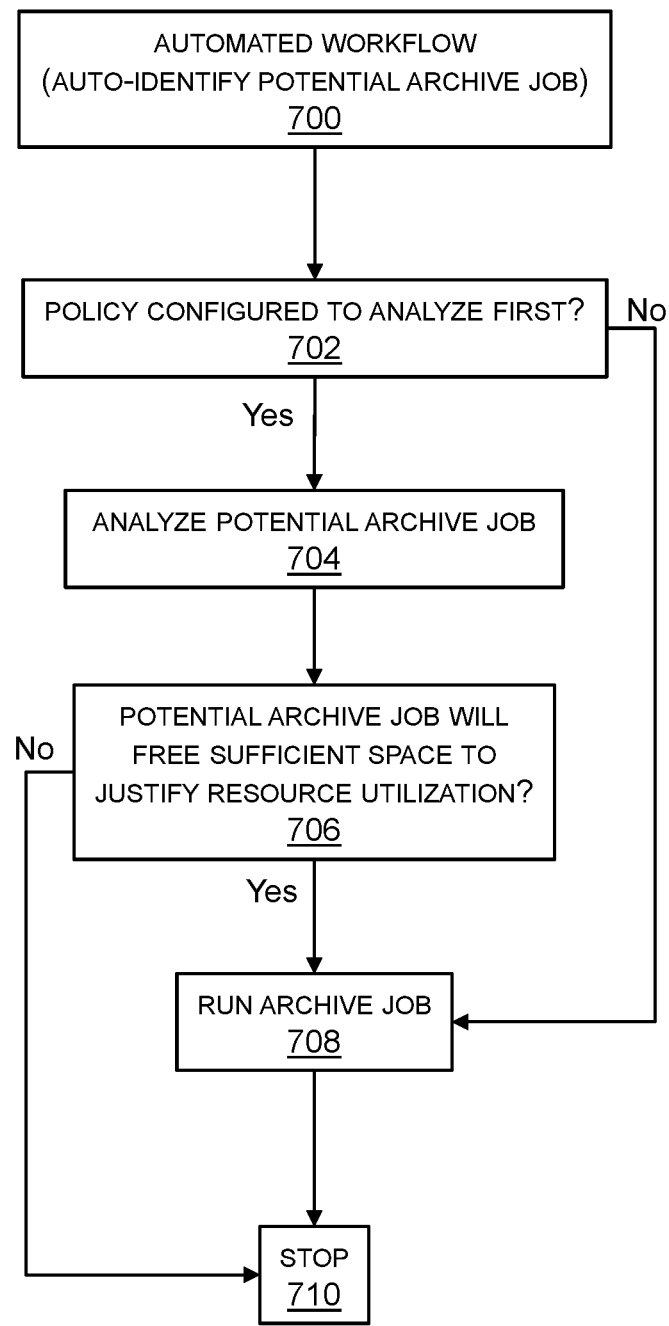
FIG. 7 illustrates an automated workflow based on the process of FIG. 5.

FIG. 7 illustrates an automated workflow based on the process of FIG. 5. The user configures an archive policy that can be scheduled to run periodically, e.g., every N weeks. All of the steps may be performed by the archival data assessor. Step 700 is auto-identifying a potential archive job. Step 702 is determining whether the policy configuration is to analyze the potential archive job before running the archive job. If the outcome is no, then step 708 is running the archive job. If the outcome is yes, then step 704 is analyzing the potential archive job. Step 706 is determining whether the potential archive job will free sufficient space to justify utilization of the resources required to run the archive job. If the determination is no, then flow stops at step 710. If the determination is yes, then step 708 is automatically running the archive job.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
   in a storage system in which storage objects on primary storage archive to secondary storage only as single units and a first storage object contains archivable data, and a second storage object contains non-archivable data, wherein the archivable data and the non-archivable data share at least some duplicated data that has been consolidated into a single stored copy on the primary storage through deduplication:
   identifying that the archivable data and the non-archivable data have been deduplicated to reference the single stored copy of the duplicated data;
   determining, while data is static, whether archive of the first storage object is justified by:
      calculating potential primary storage data reduction that would result from retaining the single stored copy of the duplicated data on primary storage and moving only a non-duplicated portion of the archivable data from the primary storage to archival storage; and
      comparing the calculated potential primary storage data reduction that would result from retaining the single stored copy of the duplicated data on primary storage and moving only the non-duplicated portion of the archivable data from the primary storage to the archival storage with a predetermined condition;
   retaining the archivable data on the primary storage without moving any of the archivable data to the archival storage in response to determining that the calculated potential primary storage data reduction fails to satisfy the predetermined condition due to the amount of duplication between the archivable data and the non-archivable data; and
   copying the archivable data from the primary storage to the archival storage as the single unit and retaining the single stored copy of the duplicated data on primary storage in response to determining that the calculated potential primary storage data reduction satisfies the predetermined condition due to the amount of duplication between the archivable data and the non-archivable data.

2. The method of claim 1 further comprising identifying a set of data structures or the storage objects as archival candidates.

3. The method of claim 2 further comprising identifying inodes of the archival candidates and identifying blocks referenced by the inodes.

4. The method of claim 3 further comprising, for each referenced block, identifying an associated reference count of associations between the referenced block and the data structures or the storage objects on the primary storage.

5. The method of claim 4 further comprising incrementing a count of saved blocks in response to the reference count being equal to 1.

6. The method of claim 5 further comprising determining whether an entry for the referenced block has already been created in a hash table in response to the reference count being greater than 1.

7. The method of claim 6 further comprising creating an entry for the referenced block in the hash table in response to determining that no entry for the referenced block exists.

8. The method of claim 6 further comprising decrementing the reference count for the referenced block in the hash table in response to determining that an entry for the referenced block exists.

9. An apparatus comprising:
primary storage comprising non-volatile media on which is stored storage objects that archive to secondary storage only as single units;
a computer configured to manage access to data stored on the primary storage;
a first storage object that contains archivable data and a second storage object that contains non-archivable data stored on the primary storage, and wherein the archivable data and the non-archivable data share at least some duplicated data that has been consolidated into a single stored copy on the primary storage through deduplication; and
an archival data assessor comprising computer-executable instructions on a non-transitory computer-readable medium that determines, while data is static, whether archive of the first storage object is justified, the archival data assessor configured to:
identify that the archivable data and the non-archivable data have been deduplicated to reference the single stored copy of the duplicated data;
calculate potential primary storage data reduction that would result from retention of the single stored copy of the duplicated data on primary storage and movement of only a non-duplicated portion of the archivable data from the primary storage to archival storage;
compare the calculated potential primary storage data reduction that would result from retention of the single stored copy of the duplicated data on primary storage and movement of only the non-duplicated portion of the archivable data from the primary storage to the archival storage with a predetermined condition;
retain the archivable data on the primary storage without moving any of the archivable data to the archival storage in response to a determination that the calculated potential primary storage data reduction fails to satisfy the predetermined condition due to the amount of duplication of between the archivable data and the non-archivable data; and
copy the archivable data from the primary storage to the archival storage as the single unit and retain the single stored copy of the duplicated data on primary storage in response to determining that the calculated potential primary storage data reduction satisfies the predetermined condition due to the amount of duplication between the archivable data and the non-archivable data.

10. The apparatus of claim 9 further comprising the archival data assessor configured to identify a set of data structures or the storage objects as archival candidates.

11. The apparatus of claim 10 further comprising the archival data assessor configured to identify inodes of the archival candidates and identify blocks referenced by the inodes.

12. The apparatus of claim 11 further comprising the archival data assessor configured to, for each referenced block, identify an associated reference count of associations between the referenced block and the data structures or the storage objects on the primary storage.

13. The apparatus of claim 12 further comprising the archival data assessor configured to increment a count of saved blocks in response to the reference count being equal to 1.

14. The apparatus of claim 13 further comprising the archival data assessor configured to determine whether an entry for the referenced block has already been created in a hash table in response to the reference count being greater than 1.

15. The apparatus of claim 14 further comprising the archival data assessor configured to create an entry for the referenced block in the hash table in response to determining that no entry for the referenced block exists.

16. The apparatus of claim 14 further comprising the archival data assessor configured to decrement the reference count for the referenced block in the hash table in response to determining that an entry for the referenced block exists.

17. A non-transitory computer-readable storage medium storing instructions that when executed by a computer cause the computer to perform a method comprising:
in a storage system in which storage objects on primary storage archive to secondary storage only as single units and a first storage object contains archivable data and a second storage object contains non-archivable data, wherein the archivable data and the non-archivable data share at least some duplicated data that has been consolidated into a single stored copy on the primary storage through deduplication:
identifying that archivable data and the non-archivable data have been deduplicated to reference the single stored copy of the duplicated data;
determining, while data is static, whether archive of the first storage object is justified by:
calculating potential primary storage data reduction that would result from retaining the single stored copy of the duplicated data on primary storage and moving only a non-duplicated portion of the archivable data from the primary storage to archival storage; and
comparing the calculated potential primary storage data reduction that would result from retaining the single stored copy of the duplicated data on primary storage and moving only the non-duplicated portion of the archivable data from the primary storage to the archival storage with a predetermined condition;
retaining the archivable data on the primary storage without moving any of the archivable data to the archival storage in response to determining that the calculated potential primary storage data reduction fails to satisfy the predetermined condition due to the amount of duplication between the archivable data and the non-archivable data; and
copying the archivable data from the primary storage to archival storage and retaining the single stored copy of the duplicated data on primary storage in response to determining that the calculated potential primary storage data reduction satisfies the predetermined condition due to the amount of duplication between the archivable data and the non-archivable data.

18. The non-transitory computer-readable storage medium of claim 17 in which the method further comprises identifying a set of data structures or the storage objects as archival candidates, identifying inodes of the archival candidates and identifying blocks referenced by the inodes, and, for each referenced block, identifying an associated reference count of associations between the referenced block and the data structures or the storage objects on the primary storage.

19. The non-transitory computer-readable storage medium of claim 18 in which the method further comprises incrementing a count of saved blocks in response to the reference count being equal to 1.

20. The non-transitory computer-readable storage medium of claim 19 in which the method further comprises determining whether an entry for the referenced block has already been created in a hash table in response to the reference count being greater than 1, creating an entry for the referenced block in the hash table in response to determining that no entry for the referenced block exists, and decrementing the reference count for the referenced block in the hash table in response to determining that an entry for the referenced block exists.

* * * * *